United States Patent
Aggarwal et al.

(10) Patent No.: US 9,210,327 B2
(45) Date of Patent: Dec. 8, 2015

(54) BLUR AWARE PHOTO FEEDBACK

(71) Applicant: Yahoo! Inc., Sunnyvale, CA (US)

(72) Inventors: Gaurav Aggarwal, Bangalore (IN); Nikhil Rasiwasia, Bangalore (IN); Kshitiz Garg, Bangalore (IN); Vijay Mahadevan, Bangalore (IN)

(73) Assignee: YAHOO! INC., Sunnyvale, CA (US)

( * ) Notice: Subject to any disclaimer, the term of this patent is extended or adjusted under 35 U.S.C. 154(b) by 37 days.

(21) Appl. No.: 14/094,010

(22) Filed: Dec. 2, 2013

(65) Prior Publication Data

US 2015/0156419 A1 Jun. 4, 2015

(51) Int. Cl.
*H04N 5/228* (2006.01)
*H04N 5/232* (2006.01)
*H04N 5/357* (2011.01)

(52) U.S. Cl.
CPC ....... *H04N 5/23293* (2013.01); *H04N 5/23251* (2013.01); *H04N 5/357* (2013.01)

(58) Field of Classification Search
CPC ... H04N 5/144; H04N 5/145; H04N 5/23248; H04N 5/23251; H04N 5/23254; H04N 5/23258; H04N 5/23264
USPC ................ 348/208.1–208.4, 208.12
See application file for complete search history.

(56) References Cited

U.S. PATENT DOCUMENTS

| | | | |
|---|---|---|---|
| 7,177,538 B2* | 2/2007 | Sato et al. | 396/55 |
| 8,937,666 B1* | 1/2015 | Padala et al. | 348/208.16 |
| 2009/0040318 A1* | 2/2009 | Brosnan et al. | 348/208.4 |
| 2009/0162045 A1* | 6/2009 | Jerdev et al. | 396/99 |
| 2010/0277605 A1* | 11/2010 | Nozaki et al. | 348/208.4 |
| 2013/0258122 A1* | 10/2013 | Keane et al. | 348/208.4 |
| 2013/0314511 A1* | 11/2013 | Chen et al. | 348/50 |
| 2014/0267801 A1* | 9/2014 | Grundmann et al. | 348/208.1 |

* cited by examiner

*Primary Examiner* — Kelly L Jerabek
(74) *Attorney, Agent, or Firm* — James J. DeCarlo; Greeneberg Traurig, LLP

(57) ABSTRACT

Users are provided with feedback regarding blurriness of an image in real-time. When an image is received, a blur score is automatically generated in addition to a visual that indicates the extent of blurriness across the picture. The blur score is calculated by aggregating an image_blur_score and optionally a motion_blur_score. A user can also be provided with suggestions on improving image sharpness and help in determining if another image needs to be taken.

16 Claims, 12 Drawing Sheets

BLUR AWARE PHOTO FEEDBACK

BACKGROUND

The increasing sophistication of mobile devices has made them so versatile that they now integrate many functions that were traditionally carried out by multiple devices. A single device, such as, a smartphone has made redundant for some purposes, other devices such as, telephones, computers, televisions, still/video cameras, music players and voice recorders. Therefore, a user who carries a smartphone is able access these various functionalities at any given time. In fact, use of such smart devices has replaced the use of traditional devices in many instances. For example, cameras integrated with smartphones have improved tremendously that they mitigate the need for people to carry separate point and shoot cameras.

SUMMARY

This disclosure relates to systems and methods for recognizing blur in images and providing feedback with a preview of the photograph or the image to improve the sharpness of blurred images. A processor-executable method of providing feedback to decrease blur and improve the image sharpness is disclosed in accordance with one embodiment. The method comprises a processor receiving an image, analyzing in real-time, data of the received image and estimating a blur score for the received image, the blur score is indicative of extent of blurriness in the received image. The method further comprises identifying, by the processor, one or more components contributing to the blur score, ascertaining if the blur score is higher than a predetermined threshold and providing real-time feedback to the user to reduce the blurriness in the received image based on the identified components. In an embodiment, the feedback provides suggestions on re-capturing the image with improved quality.

In order to estimate the blur score an image blur score is initially estimated for the received image. In this embodiment, the processor further records, light conditions at the time of image capture. The image blur score is provided as the blur score for bright light conditions. For low light conditions, a motion blur score is also calculated based on motion data associated with a device that captured the image. The image blur score and motion blur score are combined to produce the blur score.

In an embodiment, the image blur score is estimated by the processor, by identifying, strong and weak edges in the received image and producing a resultant image by performing image smoothing orthogonal to strong edges in the received image. Pixel-wise sharpness across the resultant image is estimated and aggregated over small predetermined regions of the resultant image. The average sharpness is calculated over all the predetermined regions of the resultant image. The image blur score is obtained by inverting the average sharpness.

In an embodiment, the motion blur score is estimated by the processor, by collecting motion sensor data comprising rotation and acceleration data along the three axes prior to a time of image capture and outputting the value of the maximum component of the rotational and acceleration data as the motion blur score.

A computing device comprising a processor and a storage medium for tangibly storing thereon program logic for execution by the processor is disclosed in an embodiment. The program logic comprises image receiving logic for receiving an image, image analyzing logic, for analyzing in real-time, data of the received image and blur estimating logic for estimating a blur score for the received image, the blur score is indicative of extent of blurriness in the received image. Component identifying logic, is executed by the processor, for identifying one or more components contributing to the blur score, ascertaining if the blur score is higher than a predetermined threshold and feedback providing logic is also comprised within the program logic, for providing real-time feedback to a user to reduce the blurriness in the received image based on the identified components wherein, the feedback provides suggestions on re-capturing the image with improved quality. The program logic additionally comprises light detection and storing logic for detection and recording light conditions at a time the image was taken. Image blur score estimating logic, is included in the program logic for estimating an image blur score for the received image. The program logic also comprises motion blur score estimating logic, for estimating in low light conditions, a motion blur score based on motion data associated with a device that captured the image. Combining logic, is executed by the processor, for combining image blur score and motion blur score.

A computer readable storage medium comprising processor-executable instructions is disclosed in an embodiment. The instructions when executed by the processor cause the processor to receive an image, analyze data of the received image in real-time and estimate a blur score for the received image, the blur score is indicative of extent of blurriness in the received image. In an embodiment, one or more components are identified as contributing to the blur score if the blur score is higher than a predetermined threshold and real-time feedback is provided to a user to reduce the blurriness in the received image based on the identified components, the feedback providing suggestions on re-capturing the image with improved quality. In an embodiment an image blur score is estimated for the received image. The light conditions are recorded at a time the image was taken. A motion blur score is estimated in low-light conditions. The motion blur score is based on motion data associated with a device that captured the image. The image blur score and the motion blur score are combined for estimating the blur score.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
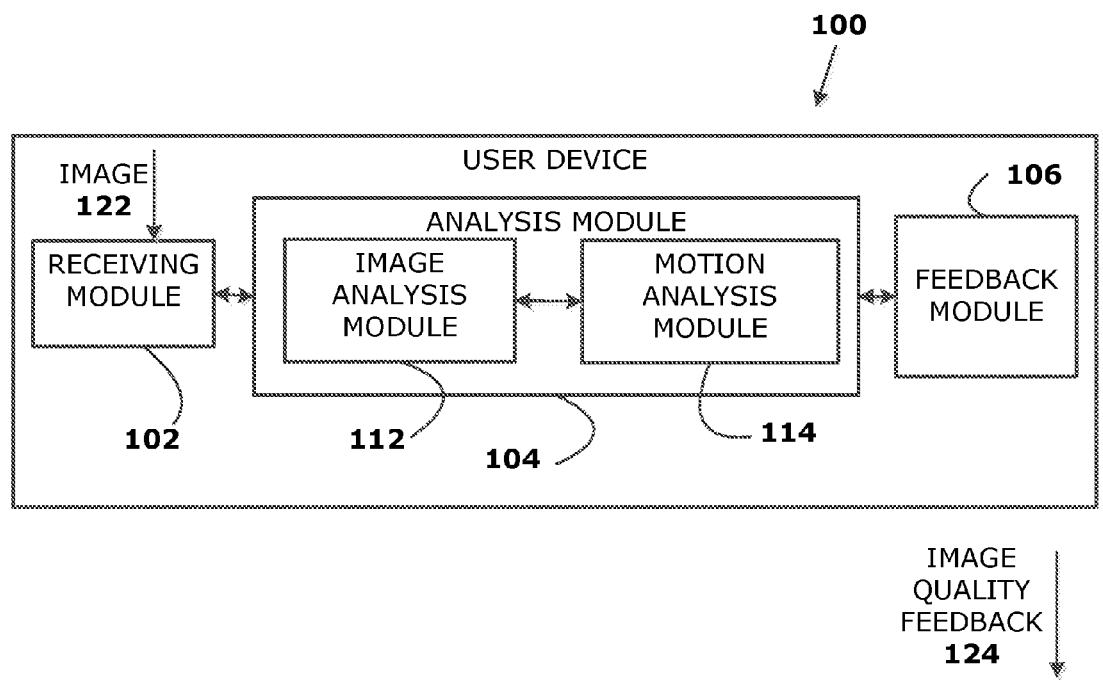
FIG. 1 is a schematic diagram of a user device comprising an apparatus that determines the extent of blurriness of a received image and provides feedback to the user in accordance with one embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Mobile photography is on the rise with users employing portable devices such as sophisticated pocket-sized digital cameras or even their smartphone cameras to capture spontaneous moments and store them digitally. One problem that users face with such portable devices is that the pictures or images they capture may appear perfect on the small screen that is usually available on the portable device whereas upon magnification to larger sizes, the images may appear blurred. An image can be blurred when points in an image appear expanded or are out-of-focus, such as, when a sharp image point is appears to be smeared into a disc shape. In order to address this problem, users tend to take multiple pictures successively. While this may increase the chances of getting at least one good image/photograph, there can exist situations where all the pictures can be blurry and have to be discarded. Thus, the user loses an opportunity to capture the moment forever. This can be especially true in situations involving scenery or events that move or change quickly or with uncooperative photographic subjects like children. Hence, immediate feedback to the users regarding the quality of the images that they have just captured can be very useful in such situations as it will permit them to recapture the image in many instances.

Various embodiments described herein provide users with feedback in real-time on improving quality of an image/photograph or picture captured by a digital device based on an automatically generated metric, such as, a blur score. The metric or the blur score can be indicative of the extent of blurriness in a captured image and feedback for improvement of the image quality can be based on the factors contributing to higher blur score in accordance with embodiments described herein. Conversely, the blur score can be indicative that the image that was captured lacks clarity of detail or sharpness. While the sharpness of an image can be limited by factors such as, the attributes of the camera capturing the image, image magnification and viewing distance, proper photographic techniques can considerably improve the image sharpness.

Turning now to the figures, FIG. 1 is a schematic diagram of a user device 100 comprising an apparatus that determines the extent of blurriness of a captured or received image 1212 and provides feedback 124 to the user for improving the image quality. In an embodiment, the user device can be a smartphone or a digital camera or any device which is used to capture images. When the feedback 124 is provided in real-time on taking the photograph, the user is enabled to address the causes of blurriness and based on the feedback 124, is able to re-take the image with substantially reduced blurriness and improved quality.

In one embodiment, the apparatus 100 comprises a receiving module 102, an analysis module 104 and a feedback module 106. The receiving module 102 is configured to receive an image, a photograph or a picture captured by a device such as a camera. In an embodiment, the receiving module 102 can be integrated with the image capturing device such as, the camera so that the receiving module 102 is also configured for image capture. In an embodiment, the camera can be integrated into a mobile user device 100 such as a smartphone. When a user employs the mobile user device 100 to take a photograph the image information is transmitted from the receiving module 102 to the analysis module 104.

The analysis module 104 is configured to analyze the received image 122 to determine the extent of blurriness. In an embodiment, the analysis module 104 computes a blur score for the received image 122 that indicates the extent of blurriness. For example, a higher blur score can be indicative of greater blur in the image. In an embodiment, a graphic representation of the blur score can be provided to the user in addition to or instead of the blur score. This can enable the user to quickly determine if he/she needs to retake the picture. In addition, the image can also be shown to include markings that point out to the users which regions of the image are out of focus. The blur score can be obtained based on various factors as will be detailed further herein. Accordingly, the analysis module 104 further comprises an image analysis module 112 and a motion analysis module 114 which analyze and determine the various factors contributing towards the image blur. It may be appreciated that while the analysis module 104 is shown to comprise two sub-modules, this is not necessary and that only the image analysis module 112 may be included in certain embodiments, such as, when the apparatus 100 is included in a point-and-shoot digital camera which may have no motion sensors.

The image analysis module 112 is configured to analyze the received image 122 in accordance with embodiments detailed herein and outputs a first metric, the image_blur_score which is generated substantially based on the data within the received image 122. In user devices that include motion sensors, such as smartphones, the motion analysis module 114 is configured to obtain and analyze the motion data of the mobile user device 100 used for taking the picture. A second metric, namely, the motion_blur_score is generated by the motion analysis module 114. The motion_blur_score determines the impact of the camera/user device movement or on the image blurring. The final blur score that is output by the analysis module 104 will thus be a combination of the image_blur_score and the motion_blur_score. In an embodiment, the image_blur_score is usually weighed higher that the motion_blur_score in its contribution to the blur score. By the way of illustration and not limitation, the blur score can be thus represented as, Blur score=4*image_blur_score+motion_blur_score, where the multiplying factor 4 can be determined, for example, empirically based on archived image data. In one embodiment, the Blur score can be normalized so that it may take a value within the range of 0.0-1.0 wherein a lesser value indicates better quality. By the way of illustration and not limitation, a great photograph can have a value of less than 0.1, a good image may have a value of about 0.1-0.25 and values above 0.25 indicate blurred images. The images whose blur_score is close to 1.0 may be extremely blurred.

The results of the analysis module 104 including the blur score, the image_blur_score and the motion_blur_score are communicated to the feedback module 106 in order to generate real-time feedback 124 to the user. In an embodiment, the feedback module 106 can be configured to compare the received results to predetermined thresholds. For example, the blur score can be compared to one or more predetermined threshold(s) based on the value ranges detailed supra to obtain the extent of blurriness in the received image 122. If the blur score is lower than the predetermined threshold, the feedback module 106 can determine that the image is good and no further photographs or images are needed and such feedback is conveyed to the user. An image that receives such feedback can be substantially blur free not only on the display screen of the mobile user device 100 but also when magnified to other sizes such as but not limited to 4"×6", 5"×7" or 8"×10". Conversely, if the blur score is higher than the predetermined threshold, the feedback module 106 determines that the image is blurry and needs to be improved. Again, it may be appreciated that when the image 122 receives such negative feedback, it may or may not appear to have blur when seen on the user device 100 display. However, when enlarged to sizes bigger than the user device screen, the image 122 can appear blurry. Therefore, the feedback module 106 can be configured to further analyze each of the image_blur_score and/or the motion_blur_score in accordance with further embodiments provided herein to provide further feedback to the user. For example, a high motion_blur_score can be indicative of greater camera movement and thereby the user can be provided feedback to hold the camera steady or to place it on a tripod. In an embodiment, the feedback module 106 can be further configured to receive external conditions, such as, ambient light for other sensors of the user device 100, in order to identify which components of the blur score should be employed the analysis for providing feedback. For example, in bright light conditions where there is sufficient ambient light, the feedback module 106 can be configured to disregard the motion_blur_score and use only the image_blur_score for analysis. In one embodiment, the feedback module 106 can be configured to provide the blur score along with the suggestions to improve image quality. In an embodiment, the feedback module 106 may not only provide the value of the blur score but may provide a graphic representation indicative of the blurriness and particular areas of the image 122 which are blurred as the real-time feedback. This can be used to take bokeh pictures wherein certain areas of the image, such as the background, are blurred to highlight other image areas such as the people or objects in the foreground. For example, the blur_score estimate in accordance with embodiments as described herein along with the blurred image can be used to take bokeh pictures.

Figure 2:
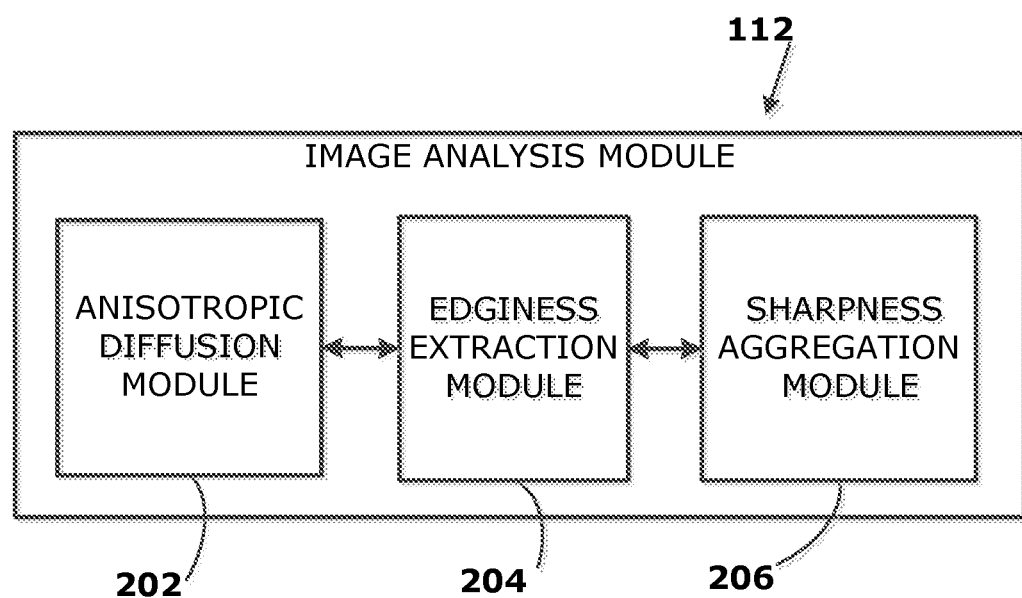
FIG. 2 is a schematic diagram of the image analysis module in accordance with one embodiment.

FIG. 2 is a schematic diagram of the image analysis module 112 in accordance with one embodiment. The image analysis module 112 analyzes the image data and generates an image_blur_score indicative of the extent of the blurriness in the receive image. The image analysis module 102 further comprises an anisotropic diffusion module 202, edginess extraction module 204 and sharpness aggregation module 206. An image is generally characterized by data such as edges, lines or other detail. An edge in an image can be recognized as the change in color. When the change in color can be identified more easily by the naked eye, such pictures appear to be sharper and hence have less blur. Within an image, different edges may differ in terms of sharpness so that some edges appear sharper than other edges which may appear more diffused or blurred. The anisotropic diffusion module 202 is configured to perform image smoothing orthogonal to the strong edges. It eliminates weak or faint edges while accentuating the strong edges. In accordance with one embodiment, the anisotropic diffusion module 202 is configured to recognize weak edges or edges that appear diffused/blurred in the received image 122 and disregard them in the calculation of the image_blur_score. Thus, the anisotropic diffusion module 202 outputs a resultant image data that includes stronger edges that are sharper or better delineate changes in color are accentuated and the weak edges within the received image 122 are smoothed.

The resultant image data from the anisotropic diffusion module 204 is transmitted to the edginess extraction module 204 which uses the data to estimate pixel-wise local sharpness across the image in accordance with methods known in the art. The output of the edginess extraction module 204, in accordance with one embodiment, can be a floating point number for each image pixel that indicates the local sharpness at that pixel. Thus, a higher floating point number for a given pixel is indicative of greater sharpness or lower blur at that pixel.

The data from the edginess extraction module 204 is received by the sharpness aggregation module 206 which aggregates the pixel-wise local sharpness across small regions of the image 122 to generate a robust local measure of sharpness across the image. In an embodiment, the sharpness aggregation module 206 can be configured to output a visual indicating the spatial variation of the sharpness across the received image 122. Thus, information from the sharpness aggregation module 206 can enable the feedback module 106 identify to the user, particular parts of the received image 122 that are blurry and warrant improvement. In addition, the sharpness aggregation module 206 generates an average sharpness of the image and calculates the image_blur_score as an inverse of the average image sharpness. Thus, the image analysis module 112 is configured to analyze the visual information or the pixel information of the received image 122 to output the image_blur_score.

Figure 3:
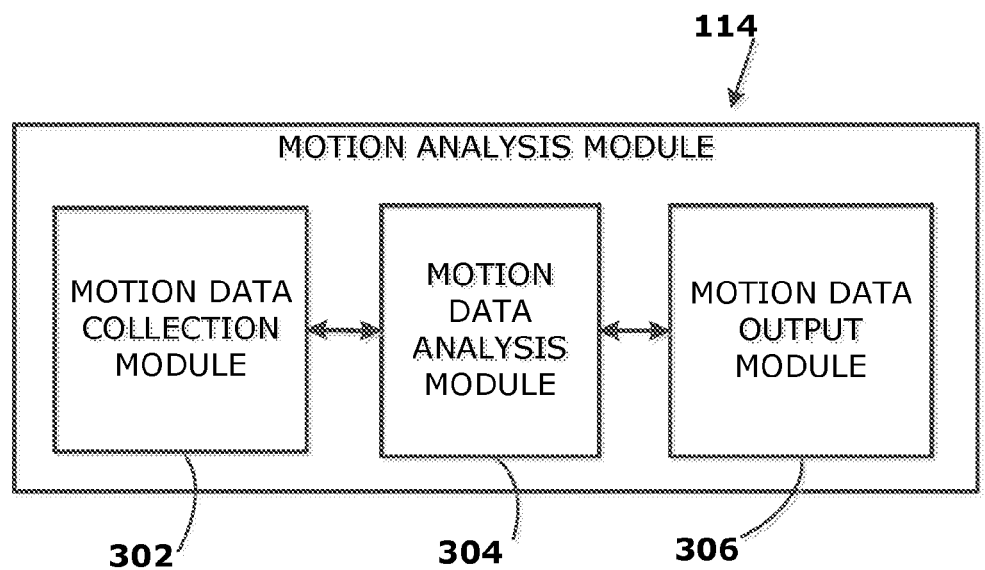
FIG. 3 is a schematic diagram of the motion analysis module in accordance with one embodiment.

FIG. 3 is a schematic diagram of the motion analysis module 114 in accordance with one embodiment. The motion analysis module 114, in accordance with one embodiment, is configured to obtain motion data of a user device capturing the image 122, analyze the motion data to determine its impact of the image blur (or sharpness) and output a motion_blur_score that indicates the extent of blur caused by the movement of the camera and/or the scene. A motion data collection module 302 is configured to collect data from the various motion sensors such as, accelerometers that are built into the user devices for detecting movement. Higher velocity or acceleration implies greater motion which leads to higher blur. A problem which exists for collecting motion data when capturing images is that the motion sensors of the user device such as the smartphone and the camera shutter are not generally synchronized. Hence, the motion data recorded may not be the data at the precise instant the image was captured. The motion data collection module 302 is thus configured to collect data a short time, for example, a few seconds prior to the user taking the photograph. For example, when the user activates a user interface element on the user device to take a photograph, the motion data collection module 302 can obtain the motion data from the sensors of the user device 100. The motion data collection module 302 is configured to collect both rotatory and translation motion components along the X, Y and Z directions—rotationRate.x, rotationRate.y, rotationRate.z, userAcceleration.x, userAcceleration.y, userAcceleration.z. The motion data thus collected is received by the motion data analysis module 304 which is configured to select a component within the received data that has the maximum magnitude. Hence, motion_blur_score can be represented as:

Motion_blur_score=max (rotationRate.x, rotationRate.y, rotationRate.z, userAcceleration.x, userAcceleration.y, userAcceleration.z)

Thus, greater the magnitude of the selected component, higher is the motion_blur_score. The motion_blur_score thus obtained is transmitted by the motion data output module 306 for further processed with the image_blur_score for estimating the blur score that is employed by the feedback module 106 for providing input to the user regarding image quality and/or suggestions for improvement.

Figure 4:
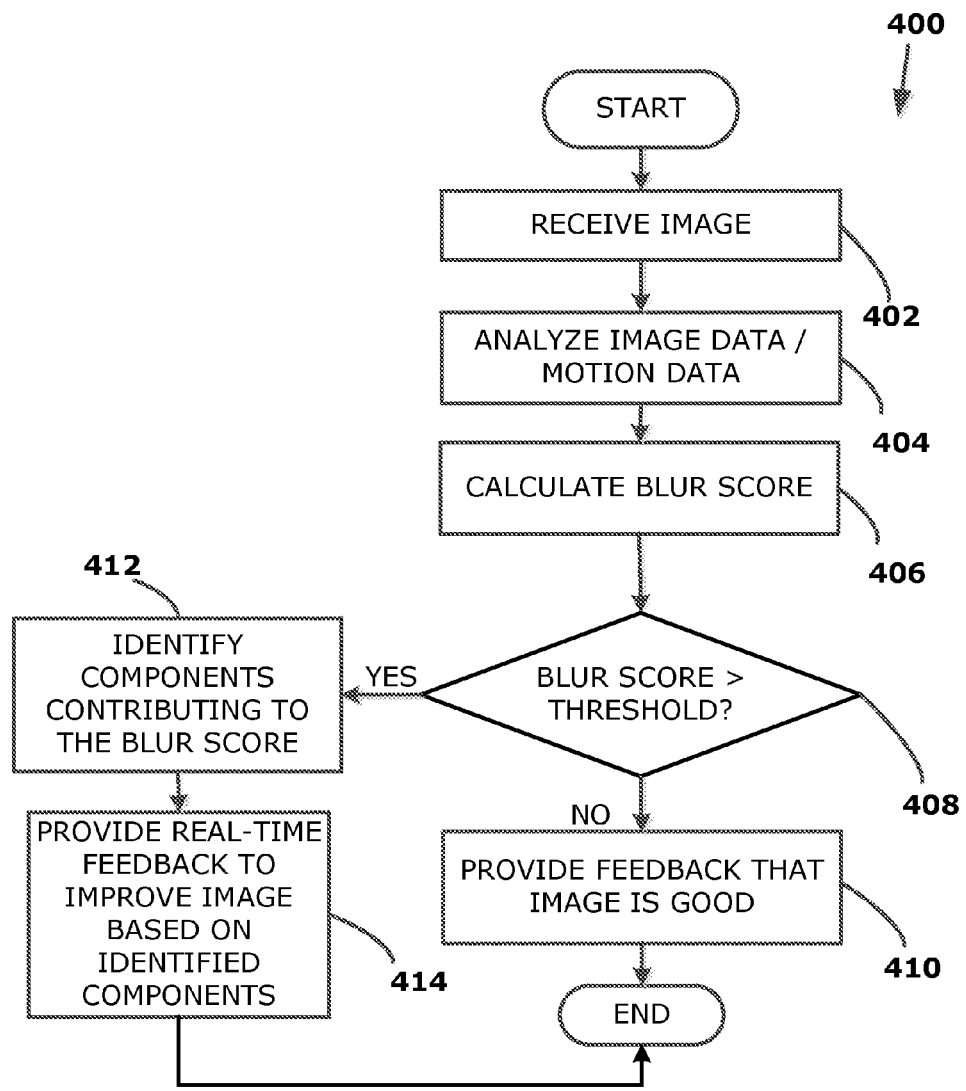
FIG. 4 is a flowchart that details a method of providing feedback regarding the image quality to a user in accordance with an embodiment.

FIG. 4 is a flowchart that details a method 400 of providing feedback regarding the image quality to a user in accordance with an embodiment. When a user takes a photograph with a camera associated with image data analysis and feedback modules as described herein, the image data is received at 402. The received image data and optionally the motion data of the camera (or a user device comprising the camera) is analyzed at 404 and a blur score is calculated 406. At 408 the blur score can be compared to a predetermined threshold. If the blur score is less than the predetermined threshold, it is determined that the image is of good/acceptable quality and such feedback is provided to the user at 410. If on the other hand, it is determined at 408 that the blur score is greater than the threshold, the components contributing to the blur score are identified at 412. As described supra, the final blur score which is indicative of the image sharpness is an aggregation of two components, image_blur_score and motion_blur_score. Accordingly, one or more of these components can be contributing to the blur score. By the way of illustration and not limitation, the percentage of contribution made by each of the two component to the blur score can be calculated at 412 in order to identify the predominant factors causing the blur. Based on the components contributing to the blur score, appropriate feedback to improve image quality is provided to the user at 414. For example, if the motion_blur_score is high, the user can be provided with real-time feedback to keep his/her hands steady or to place the camera on the tripod. Thus, based on values of particular components, the feedback module 106 can be configured to provide predetermined phrases for improving image quality if needed.

Figure 5:
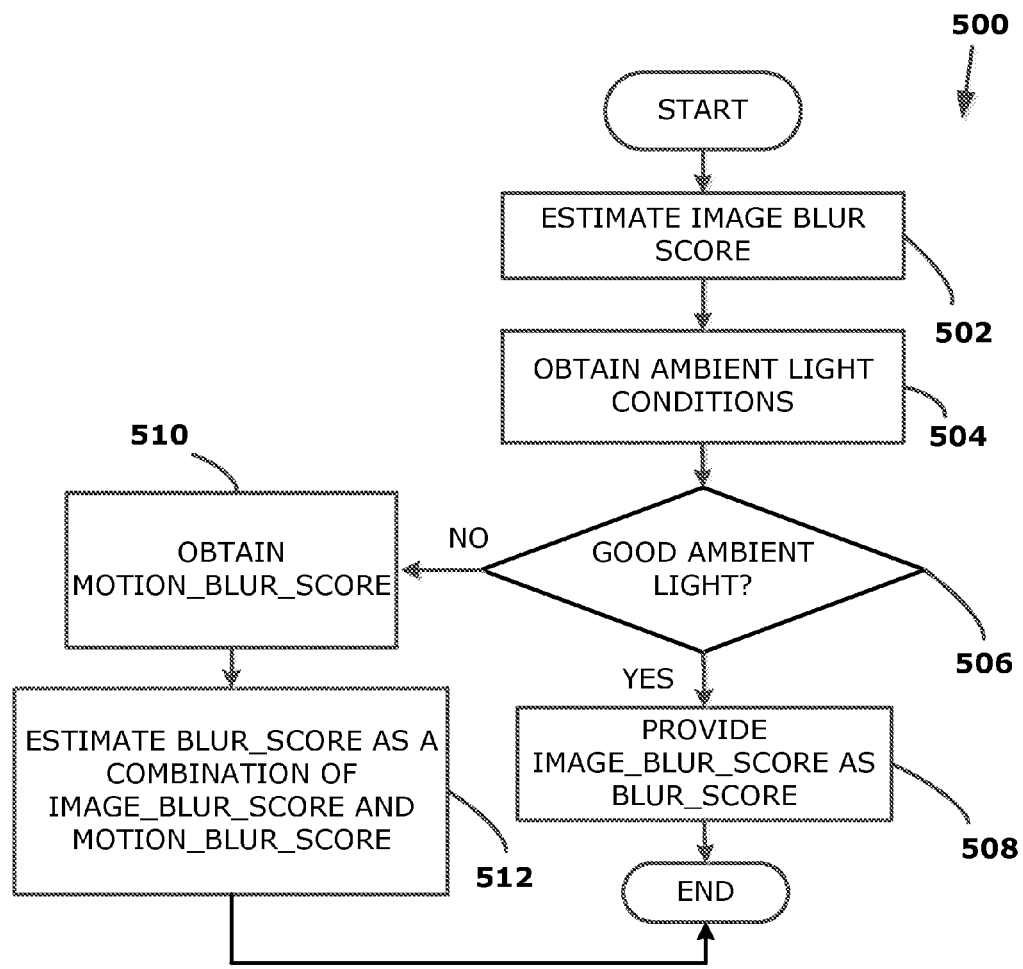
FIG. 5 is a flowchart detailing a method of estimating a blur score in accordance with embodiments described herein.

FIG. 5 is a flowchart detailing a method 500 of estimating a blur score in accordance with embodiments described herein. At 502 the image_blur_score is estimated in accordance with embodiments described herein. The final blur score which is indicative of the actual blurriness in the image as estimated by the image analysis and feedback modules described herein comprises of two predominant components, the image_blur_score and the motion_blur_score. Based on certain conditions such as ambient light, only one of these components may need to be estimated. Thus, the method 500 of estimating or calculating a blur score includes obtaining data 504 regarding the light conditions associated with the scene captured in the received image 122. The data from the light sensors associated with the camera or other user device comprising the camera can be collected and analyzed in accordance with the methods generally known in the art to determine the light conditions. If it is determined at 506 that the image was taken in bright light conditions where there is ample ambient light, the contribution of the motion_blur_score can become negligible and hence there will be no necessity to calculate the motion_blur_score. In this case, the image_blur_score is output at 508 as the final blur score and is used to provide appropriate feedback to the user. Generally, one or more of the motion of the camera taking the image, motion of the object that is the image subject or the camera lens being improperly focused can be the causes for blur in photographs in bright light conditions. If it is determined at 506 that the image was taken in conditions where there is insufficient ambient light, even slight camera movement or movement in the scene being imaged can cause considerable blur in the picture. Hence, the motion_blur_score is calculated as shown at 510. The blur_score in this case is estimated at 512 as a combination of the image_blur_score and the motion_blur_score in accordance with embodiments discussed herein.

Figure 6:
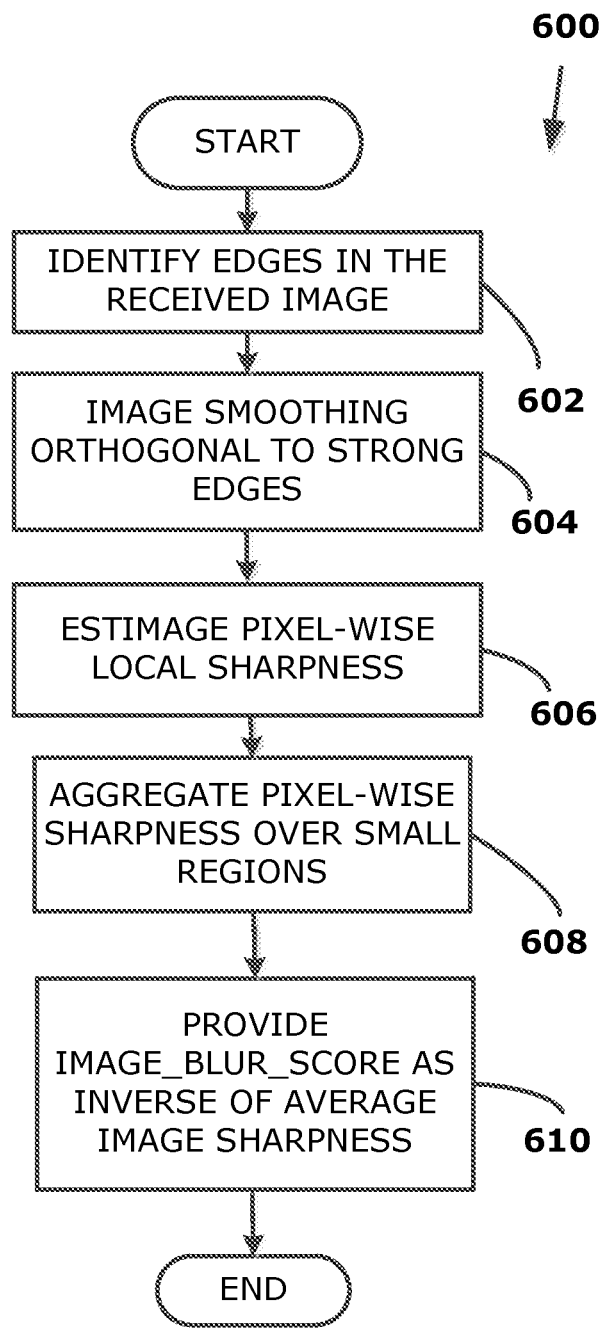
FIG. 6 is a flowchart that details a method of calculating an image_blur_score in accordance with one embodiment.

FIG. 6 is a flowchart 600 that details a method of calculating an image_blur_score in accordance with one embodiment. The received image 122 is initially processed to remove weak/spurious edges that can add noise to the estimate. Accordingly, the method begins at 602 with identifying edges in the received image122. Any change in the color or shading in the image can be considered an edge and those edges that better delineate the change can be considered as sharp or strong edges whereas edges that show a more gradual change in color can be considered as weak edges. At 604, the received image 122 is subject to image smoothing orthogonal to the strong edges so that the weak edges are eliminated from the estimation of the blur_score whereas the strong edges are accentuated. At 606, the image processed at 604 is subject to edginess extraction in order to estimate the pixel-wise local sharpness of the image. By the way of illustration and not limitation, the output at 606 can be a floating-point number for each image pixel indicating the local sharpness so that higher number is indicate of the image being sharper at that pixel. At 608, the pixel-wise local sharpness estimated at 606 is aggregated over small regions of the image to produce a robust local measure of sharpness across the image. In an embodiment, the output at 608 can be a visual indicating spatial variation of sharpness. In addition, a blur_score is produced at 610 which is estimated as the inverse of the average image sharpness obtained at step 608.

Figure 7:
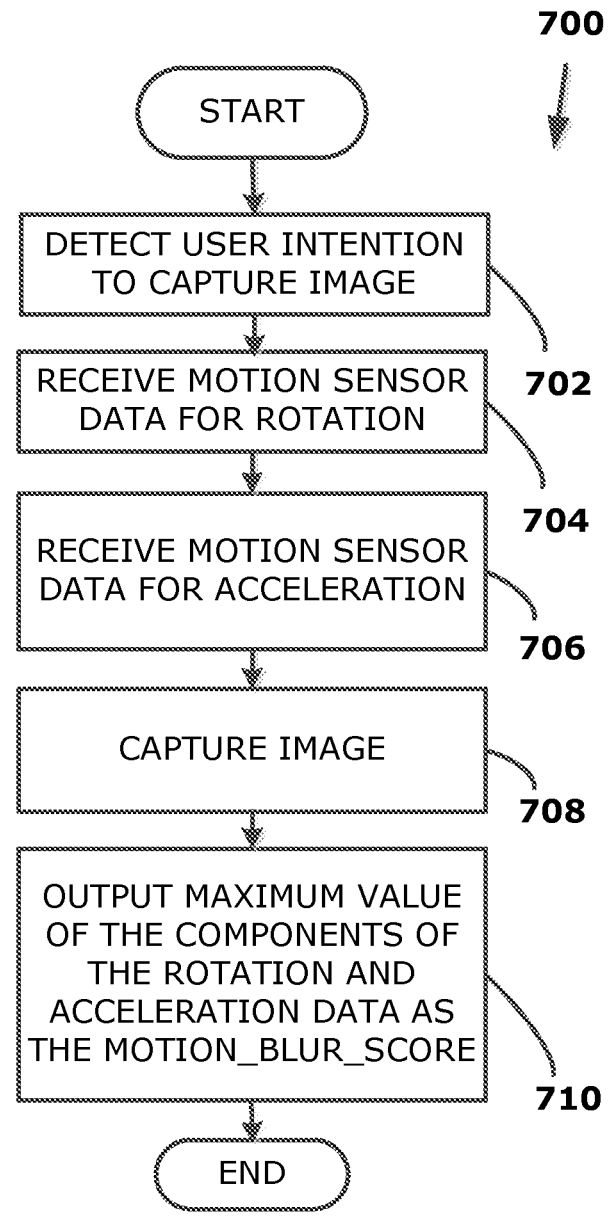
FIG. 7 is a flowchart that details a method of estimating the motion_blur_score in accordance with one embodiment.

FIG. 7 is a flowchart 700 that details a method of estimating the motion_blur_score in accordance with one embodiment. Generally collecting the motion sensor data at the instant of image capture may not be feasible since apparatus such as the user device 100 are not configured for such sophisticated procedures. Hence, in an embodiment, the motion sensor data is collected just before the image capture. By the way of illustration and not limitation, the motion sensor data can be captured when the user opens an application or software such as the receiving module 102 is activated for image capture by the user device 100. Accordingly, the method begins at 702 with detecting user intention of capturing an image via activation of an application including the receiving module 102. At 704, the motion sensor data for rotation is received. In an embodiment, the rotation rate along the x, y and z axes can be obtained at 702. Similarly, the motion sensor data for acceleration along the x, y and z axes is received at 706. For example, if the user device 100 taking the image 122 is a smartphone, it can include position/motion sensors such as accelerometers that provide the required data at steps 704, 706. At 708 the image is captured and at 710, the maximum value of the values obtained at steps 704 and 706 is identified and provided as the motion_blur_score at 710.

Figure 8:
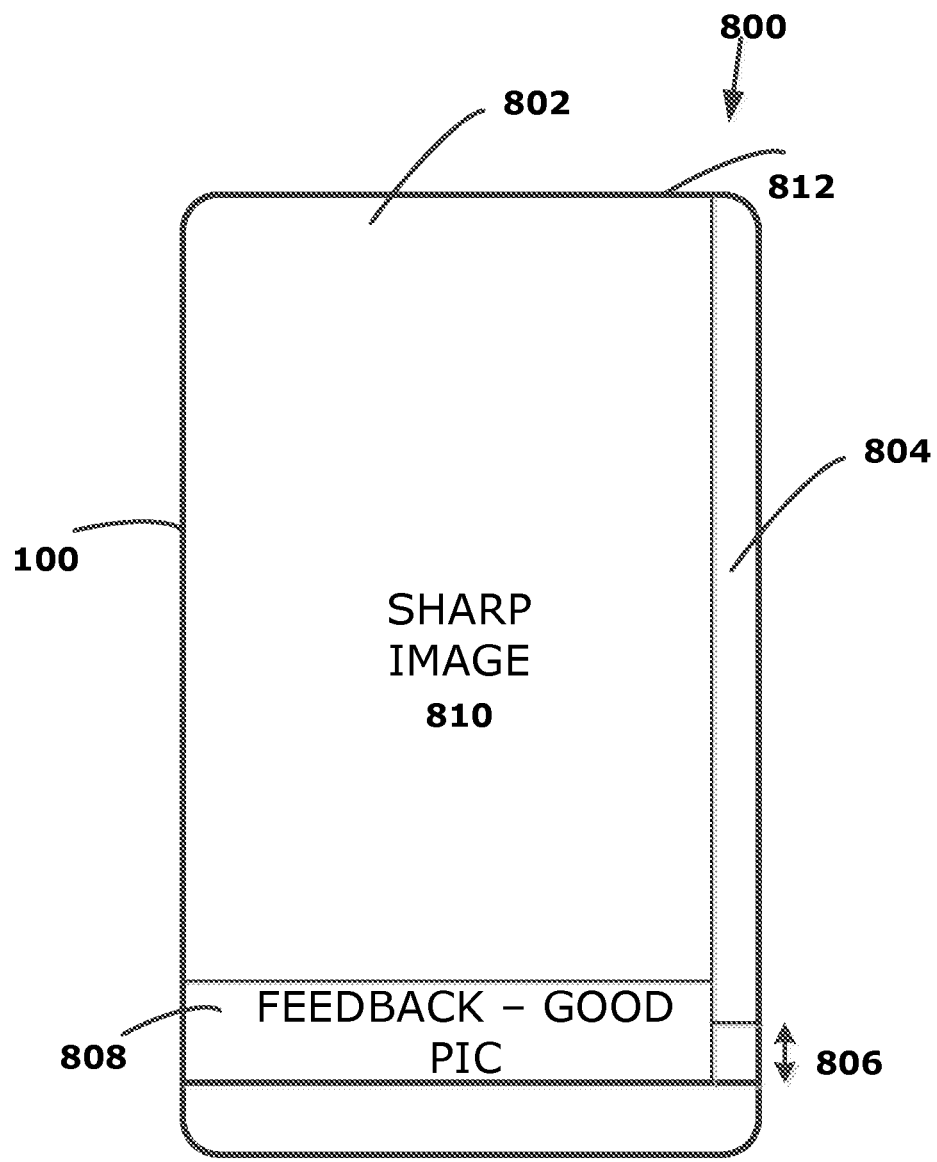
FIG. 8 is a schematic diagram of an embodiment of providing image quality feedback to a user in real-time.

FIG. 8 is a schematic diagram 800 of an embodiment of providing image quality feedback to a user in real-time. When a user takes a picture/photograph or an image with the user device 100, real-time feedback is provided to the user regarding the image quality via the user interface 802 generated on a display screen 812 of the user device 100. In an embodiment, the user interface 802 can convey the extent of blurriness in the image 810 taken by the device 100 to the user via providing the value of the blur_score. In an embodiment, the user interface 8021 can convey the extent of blurriness of the image 810 via a blur indicator 804. The blur indicator 804 can comprise an indicator column 806 whose height is indicative of the extent of blurriness in the image 810. As seen by the height of the indicator column 806, the image 810 is sharp or has very little blur and such feedback provided to the user in the feedback portion 808 of the user interface 802. It may be appreciated that the generation/display the feedback portion 808 can be optional or conditional. For example, in the case of a sharp image 810, the indicator column 806 provides adequate feedback regarding image quality and no further feedback to improve the image need be provided in the feedback portion 808 and hence it may be completely omitted from the user interface 802. By the way of illustration and not limitation, the column 806 can be filled with colors that vary from green for a good image to orange for a medium quality image and red for a low quality image.

Figure 9:
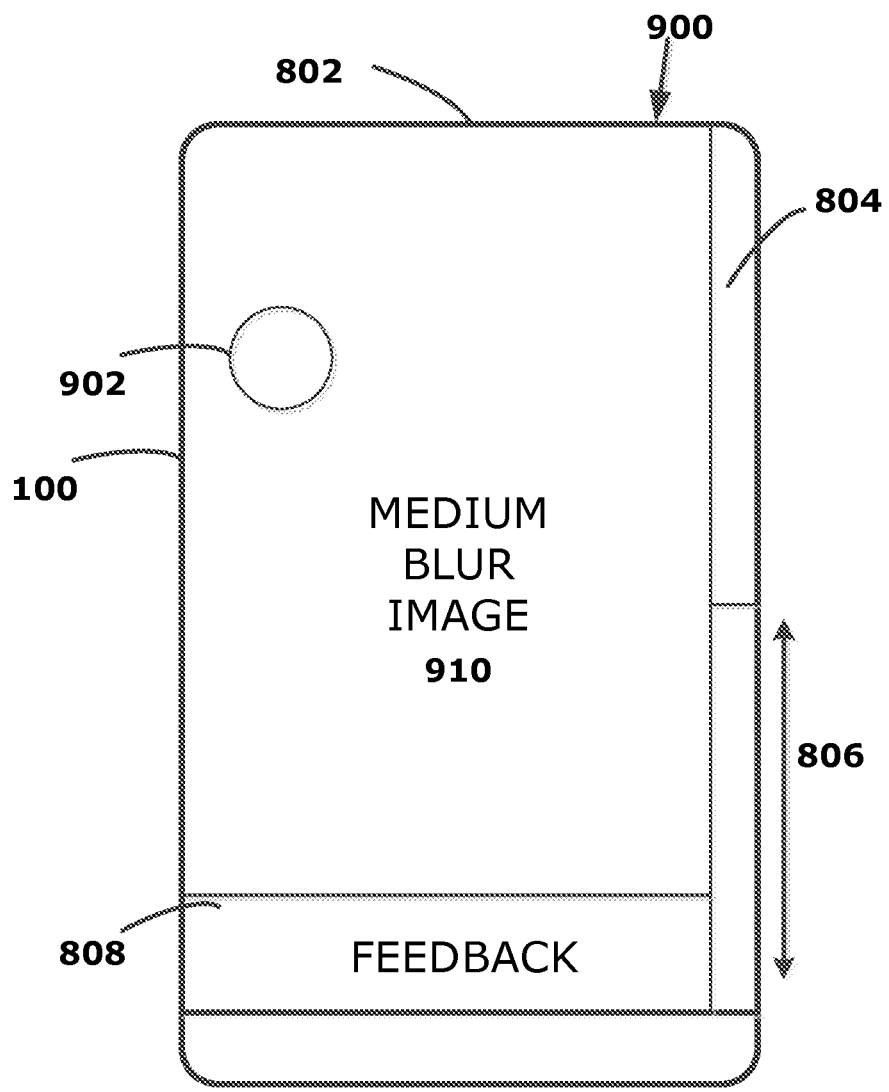
FIG. 9 is a schematic diagram of an embodiment of providing image quality feedback to a user in real-time.

FIG. 9 is a schematic diagram 900 of an embodiment of providing image quality feedback to a user in real-time. In this case, the image 910 is more blurry as compared to the image 810. This is indicated by the length of the indicator column 806. In addition, the exact area of the image 910 that is blurry can also be indicated via a mark-up 902 on the image 910. Thus, in an embodiment the feedback as described herein can be applied to generating bokeh images that selectively blur the background while enhancing the sharpness of the subject pictured in the foreground of a photograph. A feedback portion 808 of the user interface 802 provides feedback to the user in real-time to improve image quality in accordance with embodiments described herein.

Figure 10:
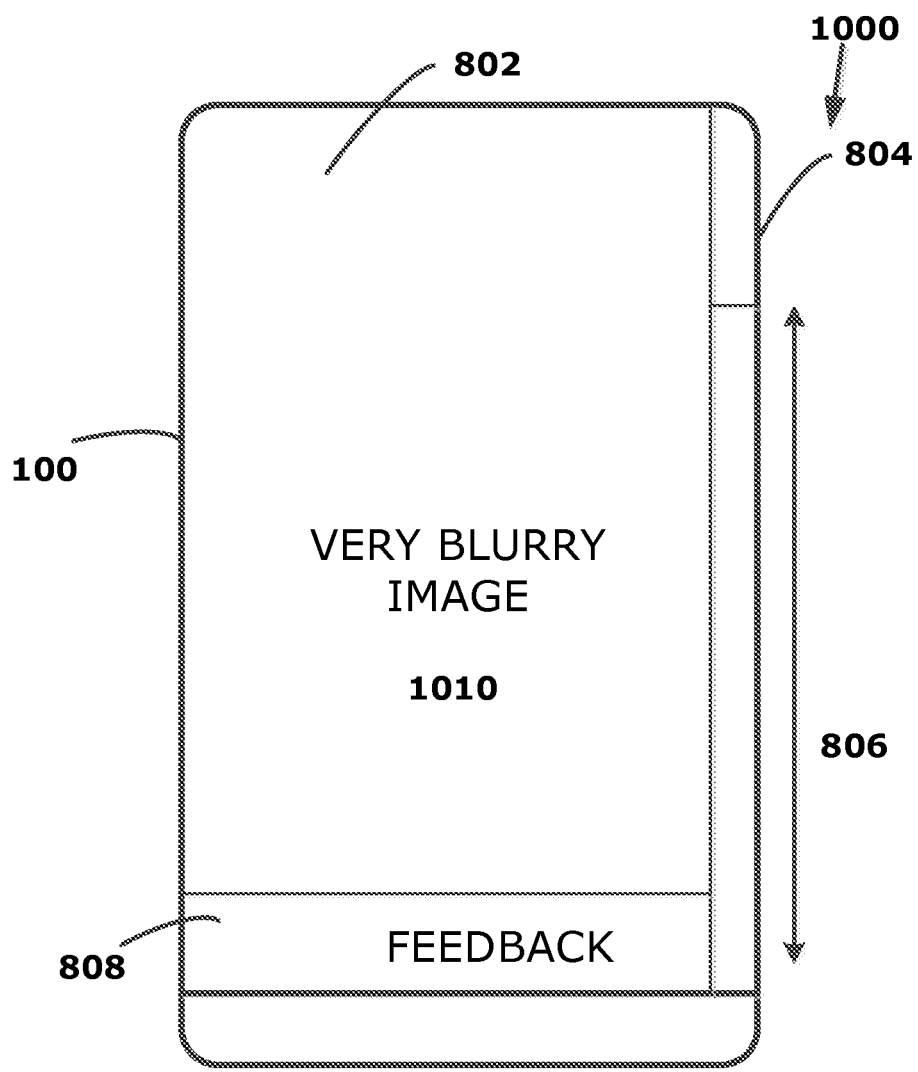
FIG. 10 is a schematic diagram of an embodiment of providing real-time feedback regarding quality of an image.

FIG. 10 is a schematic diagram 1000 of an embodiment of providing real-time feedback regarding quality of an image 1010. The image 1010 is very blurry as indicated by the length of the indicator column 806. Accordingly, the feedback portion 808 of the user interface 802 provides feedback to the user regarding image quality and/or suggestions for its improvement. For example, the feedback may instruct the user to discard the image 1010 and retake the image by placing the user device 100 on a tripod.

Figure 11:
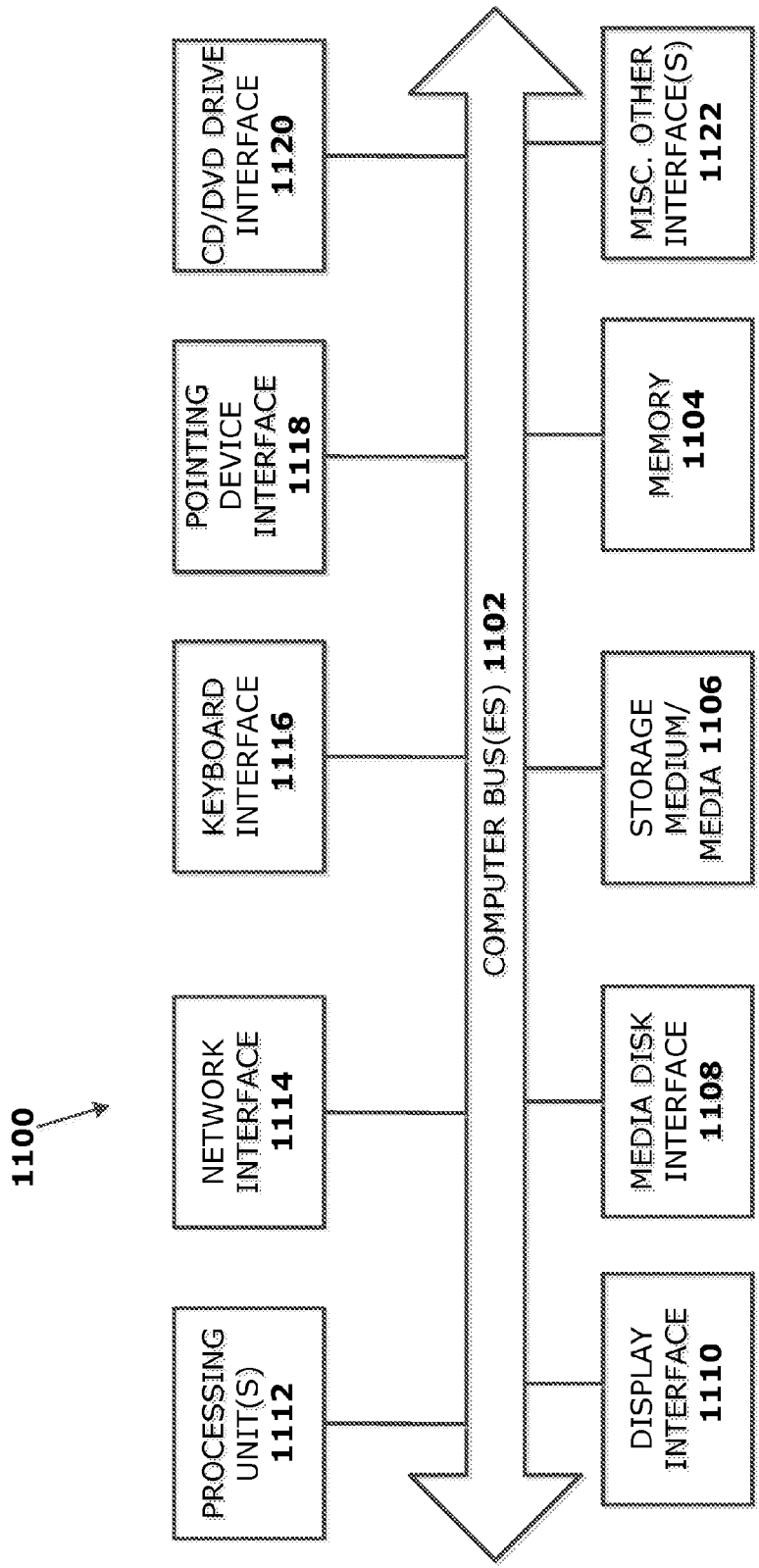
FIG. 11 illustrates internal architecture of a computing device in accordance with embodiments described herein.

As shown in the example of FIG. 11, internal architecture of a computing device 1100 includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108, an interface 1120 for a drive that can read and/or write to media including removable media such as floppy, CD-ROM, DVD, etc., media, display interface 1110 as interface for a monitor or other display device, keyboard interface 1116 as interface for a keyboard, pointing device interface 1118 as an interface for a mouse or other pointing device, and miscellaneous other interfaces 1122 not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code or logic, and/or computer-executable process steps, incorporating functionality described herein, e.g., one or more of process flows described herein. CPU 1112 first loads computer-executable process steps or logic from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage medium/media 1106 is a computer readable storage medium(s) that can be used to store software and data, e.g., an operating system and one or more application programs. Persistent storage medium/media 1106 can also be used to store device drivers, such as one or more of a digital camera driver, monitor driver, printer driver, scanner driver, or other device drivers, web pages, content files, metadata, playlists and other files. Persistent storage medium/media 1106 can further include program modules/program logic in accordance with embodiments described herein and data files used to implement one or more embodiments of the present disclosure.

Figure 12:
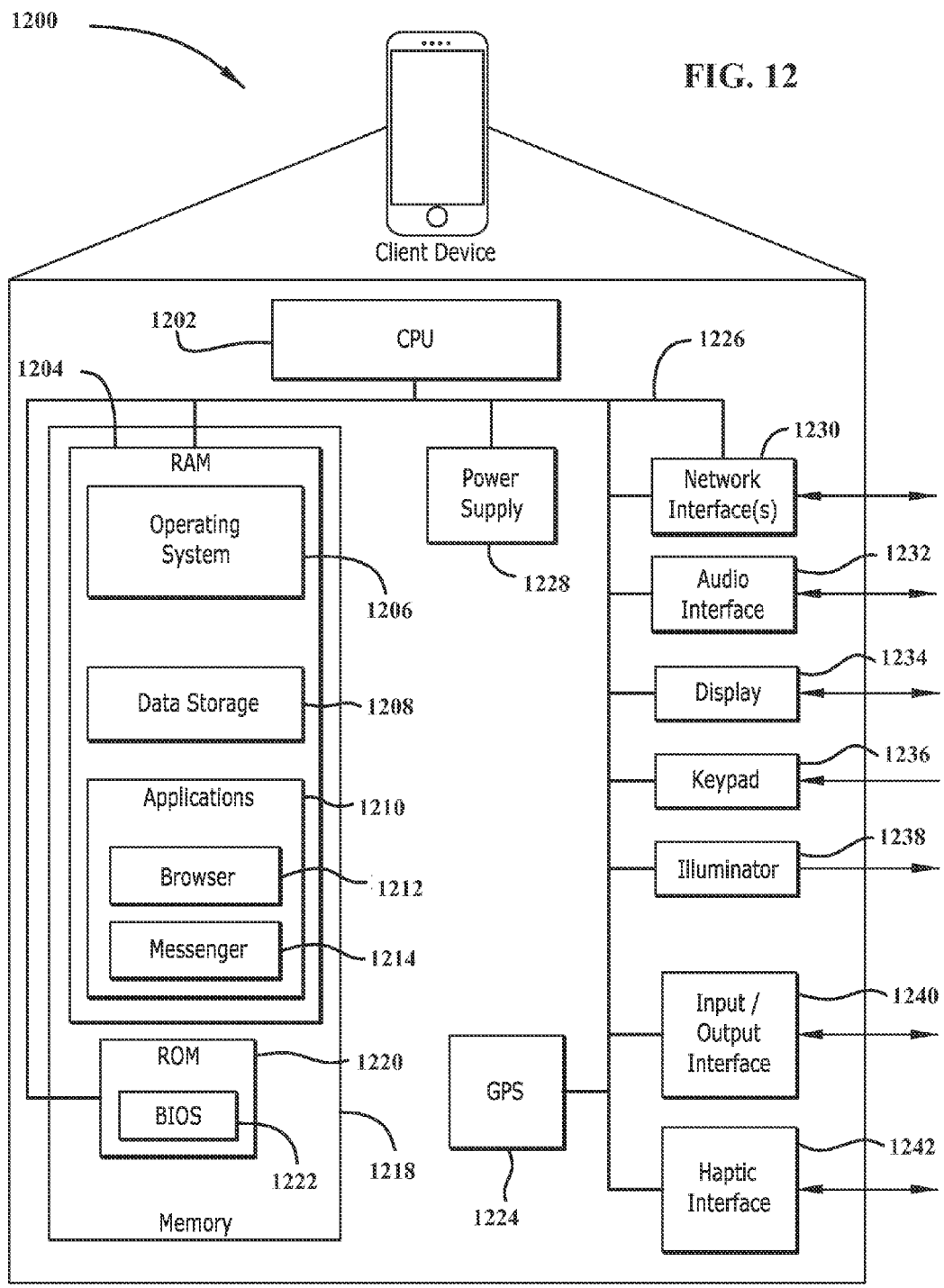
FIG. 12 is a schematic diagram illustrating a client device implementation of a computing device in accordance with embodiments of the present disclosure.

FIG. 12 is a schematic diagram illustrating a client or user device implementation of a computing device in accordance with embodiments of the present disclosure. A client device 1200 may include a computing device capable of sending or receiving signals, such as via a wired or a wireless network, and capable of running application software or "apps" 1210. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1202, power supply 1228, a memory 1218, ROM 1220, BIOS 1222, network interface(s) 1230, audio interface 1232, display 1234, keypad 1236, illuminator 1238, I/O interface 1240 interconnected via circuitry 1226. Claimed subject matter is intended to cover a wide range of potential variations. For example, the keypad 1236 of a cell phone may include a numeric keypad or a display 1234 of limited functionality, such as a monochrome liquid crystal display (LCD) for displaying text. In contrast, however, as another example, a web-enabled client device 1200 may include one or more physical or virtual keyboards 1236, mass storage, one or more accelerometers, one or more gyroscopes, global positioning system (GPS) 1224 or other location identifying type capability, Haptic interface 1242, or a display with a high degree of functionality, such as a touch-sensitive color 2D or 3D display, for example. The memory 1218 can include Random Access Memory 1204 including an area for data storage 1208.

A client device 1200 may include or may execute a variety of operating systems 1206, including a personal computer operating system, such as a Windows, iOS or Linux, or a mobile operating system, such as iOS, Android, or Windows Mobile, or the like. A client device 1200 may include or may execute a variety of possible applications 1212, such as a client software application 1214 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1200 may also include or execute an application to communicate content, such as, for example, textual content, multimedia content, or the like. A client device 1200 may also include or execute an application 1212 to perform a variety of possible tasks, such as browsing, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, by a processor, an image;
   recording, by the processor, light conditions when taking the received image;
   analyzing in real-time, by the processor, data of the received image;
   determining, by the processor, that a blur score for the received image comprises an image blur score and does not comprise a motion blur score if the light conditions are bright light conditions;
   determining, by the processor, that the blur score for the received image comprises the image blur score and the motion blur score if the light conditions are insufficient ambient light conditions;
   estimating, by the processor, the blur score for the received image, the blur score is indicative of extent of blurriness in the received image;
   comparing, by the processor the blur score with a predetermined threshold;
   instructing, by the processor, the user to store the received image if the blur score is lower than the predetermined threshold
   identifying, by the processor, one or more components contributing to the blur score if the blur score is higher than the predetermined threshold; and
   providing, by the processor, real-time feedback to a user to reduce the blurriness in the received image based on the identified components, the feedback providing suggestions on re-capturing the image with improved quality.

2. The method of claim 1, estimating an image blur score further comprising:
   identifying, by the processor, strong and weak edges in the received image; and
   producing, by the processor, a resultant image by performing image smoothing orthogonal to strong edges in the received image.

3. The method of claim 2, further comprising:
   estimating, by the processor, pixel-wise local sharpness across the resultant image;
   aggregating, by the processor, the per-pixel wise local sharpness over predetermined regions of the resultant image;
   calculating, by the processor, average sharpness over all the predetermine regions of the resultant image; and
   obtaining, by the processor, the image blur score by inverting the average sharpness.

4. The method of claim 1, further comprising:
   providing, by the processor, the image blur score as the blur score for bright light conditions.

5. The method of claim 1, estimating the blur score further comprises:
   estimating, by the processor, for low light conditions, a motion blur score based on motion data associated with a device that captured the image.

6. The method of claim 5, estimating the motion blur score further comprises:
   collecting, by the processor, motion sensor data comprising rotation and acceleration data along the three axes prior to a time the picture was taken.

7. The method of claim 6, estimating the motion blur score further comprises:
   outputting, by the processor, maximum of the rotational and acceleration data as the motion blur score.

8. The method of claim 1, wherein estimating the blur score further comprises:

combining, by the processor, image blur score and motion blur score if the light conditions are insufficient ambient light conditions.

9. An apparatus comprising:

at least one processor;

a storage medium for tangibly storing thereon program logic for execution by the processor, the program logic comprising:

image receiving logic that receives an image;

light detection and storing logic that detects and records light conditions at a time prior to taking the image;

image analyzing logic that analyzes in real-time, data of the received image;

logic that determines that a blur score for the received image comprises an image blur score and does not comprise a motion blur score if the light conditions are bright light conditions;

logic that determines that the blur score for the received image comprises the image blur score and the motion blur score if the light conditions are insufficient ambient light conditions;

blur estimating logic, executed by the processor, for estimating a blur score for the received image and comparing the blur score to a predetermined threshold, the blur score is indicative of extent of blurriness in the received image;

feedback providing logic, executed by the processor, for instructing the user to store the received image if the blur score is lower than a predetermined threshold; and component identifying logic, executed by the processor, for identifying one or more components contributing to the blur score if the blur score is higher than a predetermined threshold so that the feedback providing logic, executed by the processor, provides real-time feedback to reduce the blurriness in the received image based on the identified components, the feedback providing suggestions on re-capturing the image with improved quality.

10. The apparatus of claim 9, wherein the blur estimating logic further comprises:

image blur score estimating logic that estimates an image blur score for the received image.

11. The apparatus of claim 9, wherein the blur estimating logic further comprises:

motion blur score estimating logic that estimates in low light conditions, a motion blur score based on motion data associated with a device that captured the image.

12. The apparatus of claim 11, wherein the blur estimating logic further comprises:

combining logic that combines the image blur score and motion blur score for the insufficient ambient light conditions.

13. A non-transitory computer readable storage medium, comprising instructions, which when executed by a processor cause the processor to:

receive an image;

record light conditions prior to taking the image;

analyze data of the received image;

determine that estimation of a blur score for the received image comprises an image blur score and does not comprise a motion blur score if the light conditions are bright light conditions;

determine that the estimation of the blur score for the received image comprises the image blur score and the motion blur score if the light conditions are insufficient ambient light conditions;

estimate a blur score for the received image, the blur score is indicative of extent of blurriness in the received image;

compare the blur score to a predetermined threshold;

identify one or more components contributing to the blur score if the blur score is higher than the predetermined threshold; and provide real-time feedback to reduce the blurriness in the received image based on the identified components, the feedback providing suggestions on re-capturing the image with improved quality.

14. The computer readable medium of claim 13, further comprising instructions that cause the processor to:

estimate the image blur score for the received image.

15. The computer readable medium of claim 14, further comprising instructions that cause the processor to:

estimate, in insufficient ambient light conditions, the motion blur score based on motion data associated with a device that captured the image.

16. The computer readable medium of claim 15, further comprising instructions that cause the processor to:

combine the image blur score and the motion blur score for estimating the blur score for the insufficient ambient light conditions.

* * * * *